United States Patent
Wang et al.

(10) Patent No.: US 11,122,248 B1
(45) Date of Patent: Sep. 14, 2021

(54) STEREO VISION WITH WEAKLY ALIGNED HETEROGENEOUS CAMERAS

(71) Applicant: Black Sesame International Holding Limited, Santa Clara, CA (US)

(72) Inventors: Zuoguan Wang, Los Gatos, CA (US); Jizhang Shan, Los Gatos, CA (US)

(73) Assignee: Black Sesame International Holding Limited, San Jose, CA (US)

( * ) Notice: Subject to any disclaimer, the term of this patent is extended or adjusted under 35 U.S.C. 154(b) by 0 days.

(21) Appl. No.: 16/932,830

(22) Filed: Jul. 20, 2020

(51) Int. Cl.
*H04N 13/128* (2018.01)
*H04N 13/246* (2018.01)
*H04N 13/239* (2018.01)
*H04N 13/00* (2018.01)

(52) U.S. Cl.
CPC ......... *H04N 13/128* (2018.05); *H04N 13/239* (2018.05); *H04N 13/246* (2018.05); *H04N 2013/0081* (2013.01)

(58) Field of Classification Search
CPC .. H04N 13/359; H04N 13/324; H04N 13/398; H04N 13/361; H04N 13/32
USPC .......................................................... 348/47
See application file for complete search history.

(56) References Cited

U.S. PATENT DOCUMENTS

| | | | | |
|---|---|---|---|---|
| 7,003,136 | B1 * | 2/2006 | Harville | G06K 9/00201 348/169 |
| 10,410,372 | B1 * | 9/2019 | Bapat | G06T 7/292 |
| 2004/0153671 | A1 * | 8/2004 | Schuyler | G07C 9/00 726/9 |
| 2008/0050042 | A1 * | 2/2008 | Zhang | G06T 19/006 382/294 |
| 2008/0058593 | A1 * | 3/2008 | Gu | G06T 5/006 600/109 |

* cited by examiner

*Primary Examiner* — Tung T Vo
(74) *Attorney, Agent, or Firm* — Timothy T. Wang; Ni, Wang & Massand, PLLC

(57) ABSTRACT

A method of depth estimation utilizing heterogeneous cameras, comprising, homogenizing a first camera image and a second camera image based on a first camera calibration dataset and a second camera calibration dataset respectively, wherein the first camera image and second camera image are distortion corrected and are zoom compensated, determining an initial image pair rectification transformation matrix of the homogenized first camera image and the homogenized second camera image, determining a delta image pair rectification transformation matrix based on the initial image pair rectification transformation matrix, determining a final image pair rectification transformation matrix based on the initial image pair rectification transformation matrix and the delta image pair rectification transformation matrix resulting in a final rectified image pair and disparity mapping the final rectified image pair based on a depth net regression.

8 Claims, 7 Drawing Sheets

STEREO VISION WITH WEAKLY ALIGNED HETEROGENEOUS CAMERAS

BACKGROUND

Technical Field

The instant disclosure is related to stereo systems and stereo vision utilizing weakly aligned heterogeneous cameras.

Background

A stereoscopic view may be used to recover the depth information of a scene with two images taken from different views. The depth information may be utilized by computer vision applications, including depth perception in autonomous driving. Stereo vision allows determination of an object's distance based on the triangulation of epipolar geometry, in which the distance is represented by a horizontal pixel shift in the left and right rectified image pair, also known as a disparity map.

SUMMARY

A first example of depth estimation utilizing two heterogeneous cameras, the method comprising at least one of, homogenizing a first camera image and a second camera image based on a first camera calibration dataset and a second camera calibration dataset respectively, wherein the first camera image and second camera image are distortion corrected and are zoom compensated, determining an initial image pair rectification transformation matrix of the homogenized first camera image and the homogenized second camera image, determining a delta image pair rectification transformation matrix based on the initial image pair rectification transformation matrix, determining a final image pair rectification transformation matrix based on the initial image pair rectification transformation matrix and the delta image pair rectification transformation matrix resulting in a final rectified image pair and disparity mapping the final rectified image pair based on a depth net regression.

A second example of depth estimation utilizing two heterogeneous cameras, the method comprising at least one of, calibrating a first camera having a first camera calibration dataset, calibrating a second camera having a second camera calibration dataset, the second camera having at least one of a different focal length, a different field of view and a different pixel count than the first camera, distortion correcting between a first camera image and a second camera image based on the first camera calibration dataset and the second camera calibration dataset, focal length compensating between the first camera image and the second camera image based on the first camera calibration dataset and the second camera calibration dataset, rectifying an image pair between the distortion corrected and focal length compensated first camera image and the second camera image based on a transformation matrix regression and disparity mapping the rectified image pair based on a depth net regression.

A third example of depth estimation utilizing two heterogeneous cameras, the method comprising at least one of, calibrating a first camera having a first camera calibration dataset, calibrating a second camera having a second camera calibration dataset, the second camera having at least one of a different focal length, a different field of view and a different pixel count than the first camera, distortion correcting between a first camera image and a second camera image based on the first camera calibration dataset and the second camera calibration dataset, focal length compensating between the first camera image and the second camera image based on the first camera calibration dataset and the second camera calibration dataset, disparity mapping the distortion corrected and focal length compensated first camera image based on a depth net regression, determining an initial pose based on the first camera calibration dataset and the second camera calibration dataset, pose mapping using a pose net the first camera image and the second camera image and the initial pose and outputting a delta pose, warping the delta pose, the disparity mapping and the first camera image and reconstructing the warping and the distortion corrected and focal length compensated second camera image to minimize a reconstruction error.

DETAILED DESCRIPTION

Figure 1:
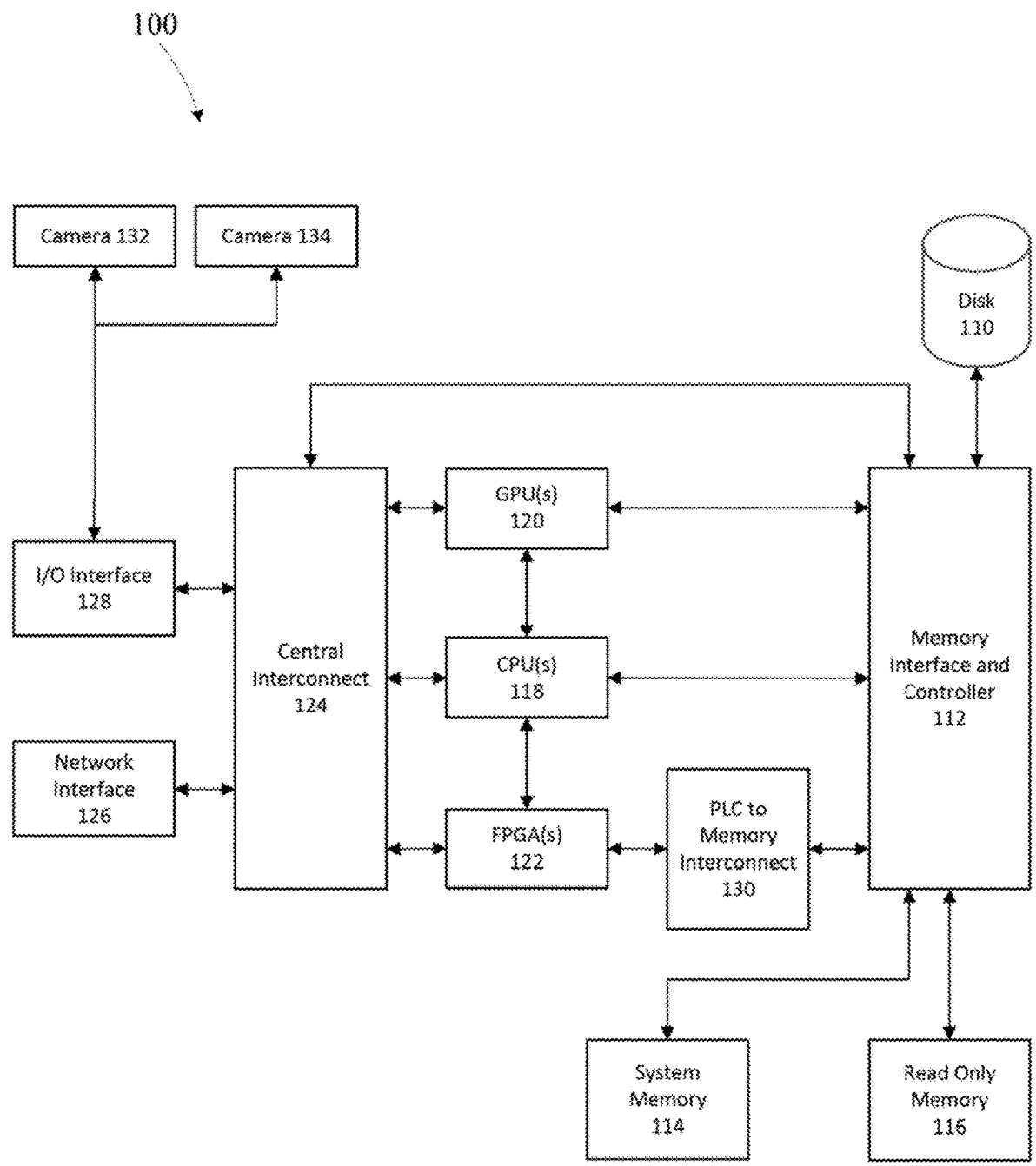
FIG. 1 is a first example system diagram in accordance with one embodiment of the disclosure.

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

One current issue utilizing stereo cameras is the camera misalignment or mismatch, which may significantly affect 3-D depth estimates. The stereo cameras may be subject to various environmental factors, such temperature changes, mechanical stresses and vibrations and the like. These factors among others may cause baseline shifts in the roll, pitch and yaw angle. Currently, in an attempt to counter these factors, the stereo cameras may be fixed in a stereo specific rig, which may boost the cost of deployment and limit its practical use.

In the modern vision based system typically more than one camera are utilized to achieve different functions. In one example, in an autonomous driving system, there may be two or three front cameras with different field of views (FOVs) in order to observe objects at different distances. In the instant application the use of heterogeneous cameras is applied to stereo vision. Compared with typical stereo camera systems, these heterogeneous cameras may have different distortions or focal lengths. Additionally, the alignment between cameras may not be mechanically enforced as in typical stereo camera systems, and may drift over time. To address the issues involved in the use of heterogeneous cameras for stereo systems, a solution is proposed to perform image distortion correction and zoom compensation based on the results of camera calibration before image rectification. Additionally the relative pose between cameras will be approximated as generally accurate, and having slight drifts over time, with the drifts tending to be consistent over short time intervals. The proposed solution utilizes, in part, online pose correction to track and compensate the pose shift.

A traditional stereo vision system is composed of homogeneous dual cameras, with the depth is represented as disparity map between rectified images of the two cameras.

Additionally, we will propose a solution for monocular depth estimation, in which only a single camera is utilized. Due to the difficulty of obtaining ground truth depth, the monocular depth is typically trained utilizing indirect information, such as triangulation between adjacent frames of videos. In this method, the pose change between frames is estimated which is more challenging than regressing a pose drift of stably positioned cameras. Thus the instant application proposes a solution for weakly aligned heterogeneous cameras to provide depth supervision information in the training of a monocular depth estimator.

FIG. 1 depicts an example automated parking assistance system 10 that may be used to implement deep neural nets associated with the operation of one or more portions or steps of processes 700 and 800. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a deep neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
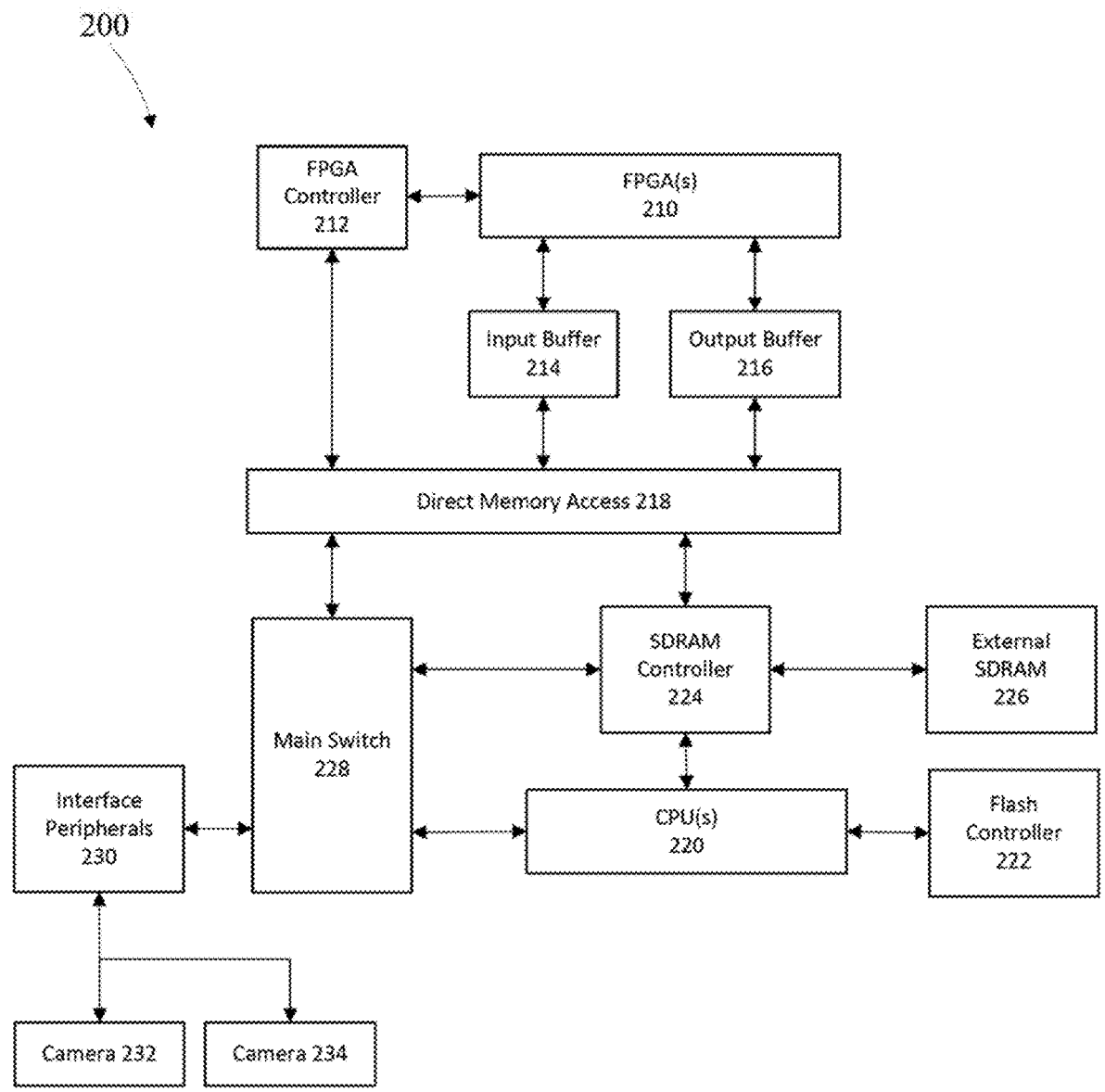
FIG. 2 is a second example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 connected to a first camera 132, a second camera 134 and the network interface 126.

FIG. 2 depicts a second example hybrid computational system 200 that may be used to implement neural nets associated with the operation of one or more portions or steps of flow 500. In this example, the processors associated with the system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, the buffers are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to a synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230 connected to a first camera 232 and a second camera 234. A flash controller 222 controls persistent memory and is connected to the CPU 220.

Depth Estimation from Dual Heterogeneous Cameras

Figure 3:
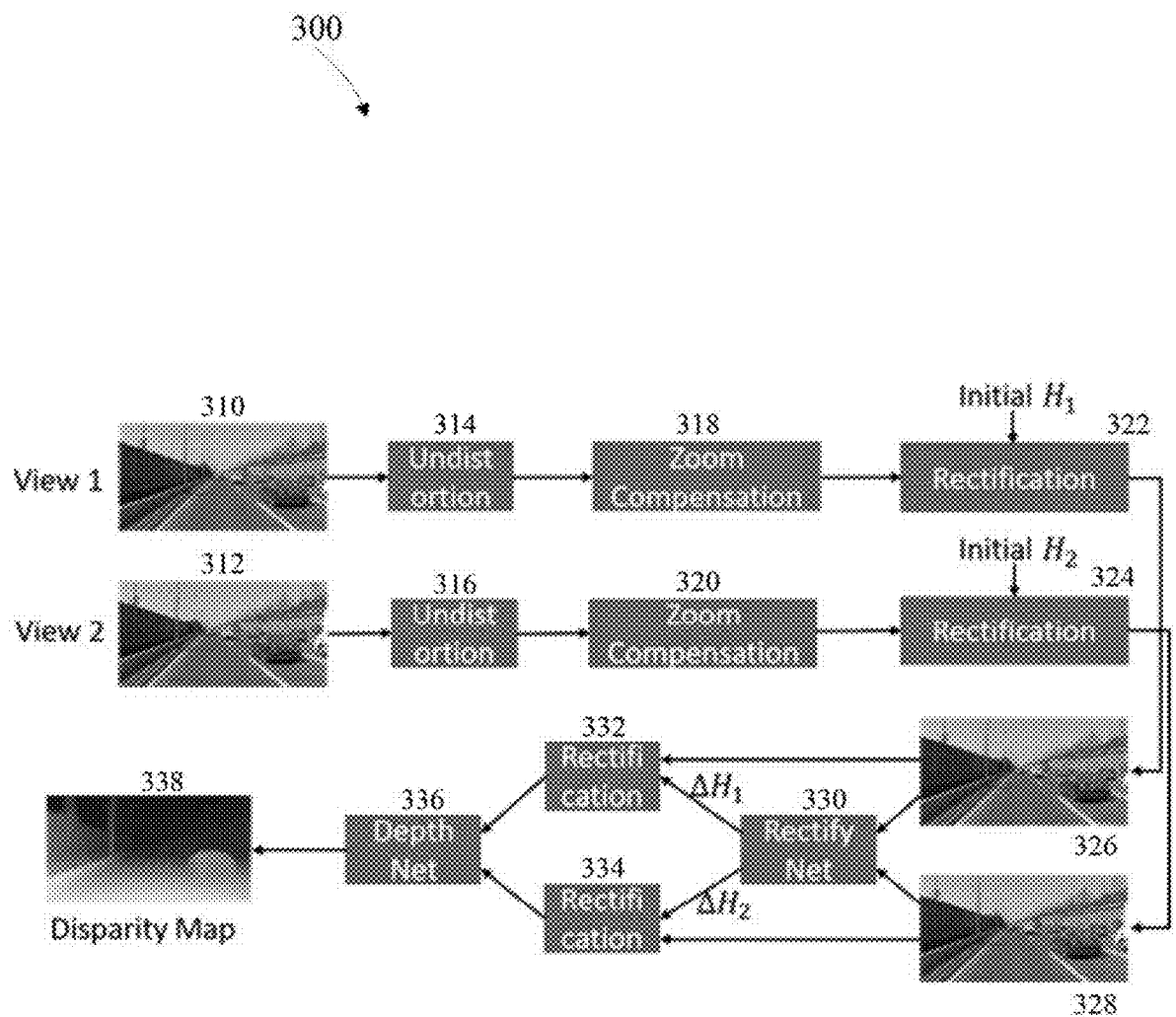
FIG. 3 is an example logic flow of depth estimation from dual heterogeneous cameras in accordance with one embodiment of the disclosure.

FIG. 3 depicts a first image 310 from a first camera having a first camera calibration dataset and a second image 312 from a second camera having a second camera calibration dataset, the second camera having at least one of a different focal length, a different field of view and a different pixel count than the first camera. The first image 310 undergoes distortion correcting 314 and the second image 312 undergoes distortion correcting 316. The distortion corrected first image undergoes zoom compensation 318 and the distortion corrected second image undergoes zoom compensation 320. The processes of distortion correction and zoom compensation render the first image and the second image homogeneous. The distortion corrected and zoom compensated first image undergoes an initial first image rectification 322 which utilized transformation matrix $H_1$ yielding an initially rectified first image 326. The distortion corrected and zoom compensated second image undergoes an initial second image rectification 324 which utilized transformation matrix $H_2$ yielding an initially rectified second image 328. The initially rectified first image and the initially rectified second image are passed through a transformation matrix regression 330 to yield the shifts the shift, $\Delta H_1$ and $\Delta H_2$ resulting in the final first image rectification 332 and the final second image rectification 334. The final first image rectification 332 and the final second image rectification 334 are sent to depth net 336 yielding a disparity map 338 from which depth information may be obtained.

To process images from heterogeneous cameras, preprocessing is utilized to homogenize the images which are rectified. The preprocessing consists of two steps, distortion correction 314, 316 and zoom compensation 318, 320. A neural network H is utilized to regress the drift of the rectifying transformation matrix.

The method may include:
1) Calibration of a first camera and a second camera;
2) Image distortion correction based on the intrinsic parameters obtained in step 1);
3) Zoom compensation is to compensate for any focal length differences between the first camera and the second camera. For example, based on the perspective geometry, the image in view 2 312 may be projected to view 1 310 by $$x_1 = \frac{f_1}{f_2} x_2$$

and $$y_1 = \frac{f_1}{f_2} y_2.$$

4) Several methods may be utilized to rectify the images. For example it may be done through camera calibration or by solving the equations by the fundamental matrix, $x_1^T H_1^T F_\infty H_2 x_2 = 0$ among other methods.

5) The rectify net 330 regresses the minor shift of transformation matrix H. The input to the rectify net are the rectified image pair 326, 328 and the output are the shift, $\Delta H_1$ and $\Delta H_2$. The rectify net may be trained end-to-end or independently. The disparity map 338 from rectified images may be obtained through depth net 336.

Depth Supervision for Monocular Depth Estimation

Figure 4:
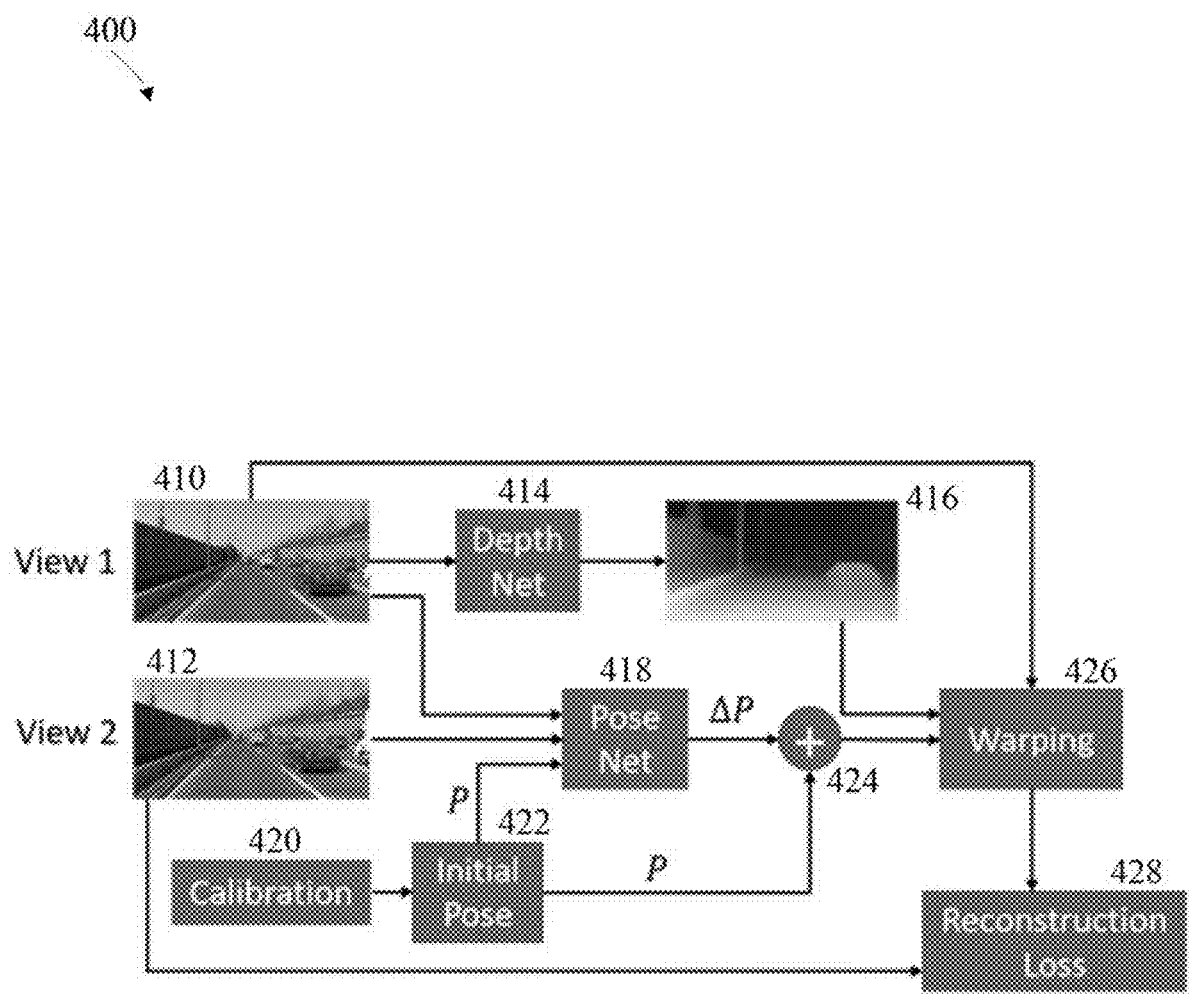
FIG. 4 is an example logic flow of depth supervision for monocular depth estimation in accordance with one embodiment of the disclosure.

FIG. 4 depicts a first image 410 from a first camera having a first camera calibration dataset and a second image 412 from a second camera having a second camera calibration dataset, the second camera having at least one of a different focal length, a different field of view and a different pixel count than the first camera. The first camera calibration dataset and the second camera calibration dataset are determined by an initial calibration 420. A depth net 414 is utilized for a disparity mapping 416 regression of the distortion corrected and focal length compensated first camera image. The initial pose 422 is based on the initial calibration 420. Pose net 418 receives the first image 410, the second image 412 and the initial pose to determine a delta pose. The initial pose 422 and the delta pose are summed. The system then warps 426 the initial image the disparity mapping 416 and the summed initial pose and delta pose. The warp 426 and the second image are regressed to minimize a reconstruction error 428.

The overall logic to train the monocular depth estimator is similar with that based on video, as shown in FIG. 4. The key difference is the pose estimation. While in the training based on video, the camera pose change P is regressed between adjacent frames, and an estimation of a small incremental change $\Delta P$, is determined which is much less challenging, and results in an estimation that is stable and accurate. The pose net takes the image pair and initial pose P as the input and outputs a pose drift $\Delta P$. The final relative pose is the overlap of initial pose P and $\Delta P$.

Utilizing the depth map Z and regressed pose $P+\Delta P=\{R, t\}$, the reconstruction of view 2 from view 1 can be warped through $$z_2 p_2 = K_2 R K_1^{-1} z_1 p_1 + K_2 t,$$

where K is the camera intrinsic matrix and p is pixel coordinates in its homogeneous form.

The training objective function is to minimize the reconstruction error $$L = \Sigma_p |I_1(p) - I_2(p)| + \alpha |\Delta P|,$$

where constrain the magnitude of $\Delta P$ is constrained and which is expected to have very limited value. The depth net and pose net parameters are optimized in this example.

EXAMPLES

Figure 5:
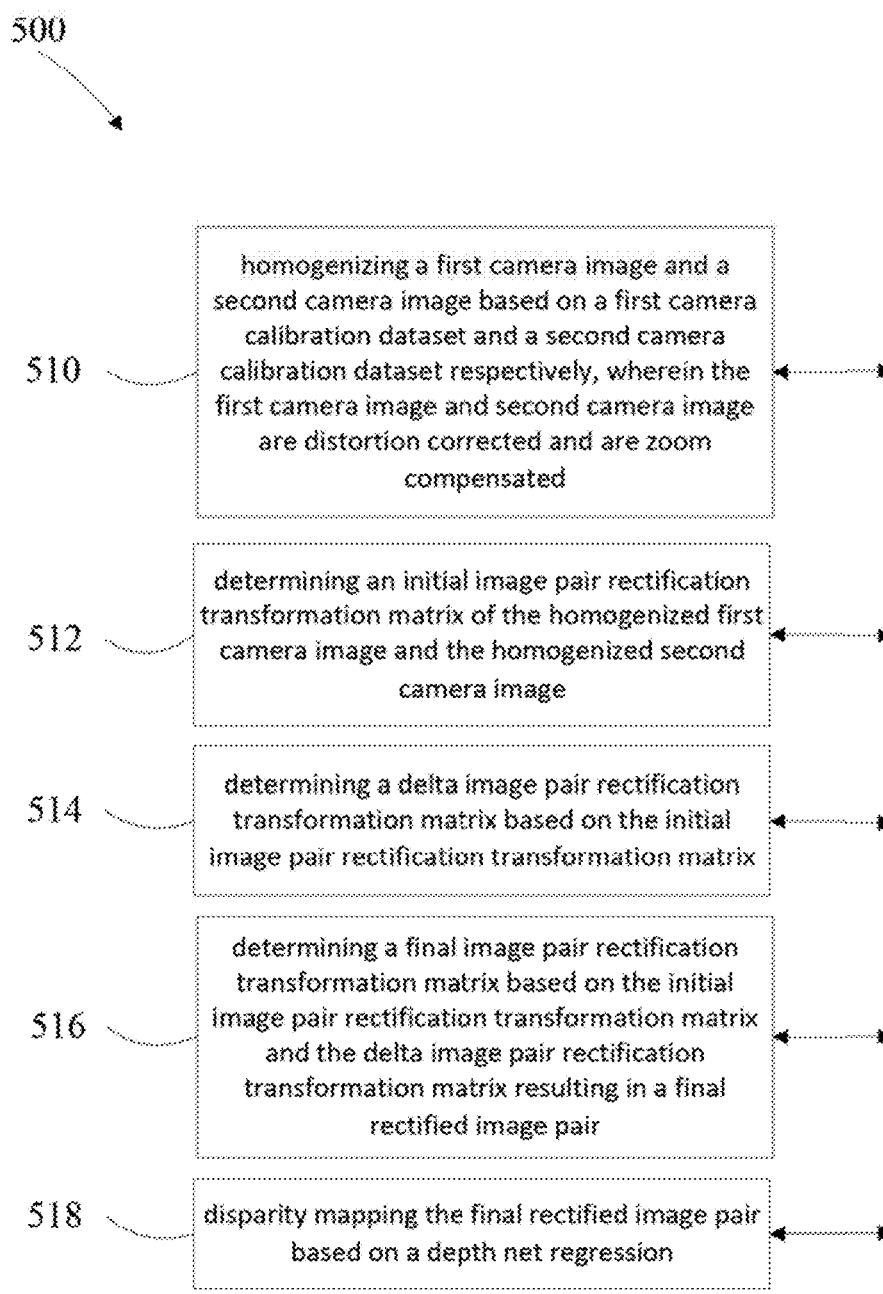
FIG. 5 is a first example method of depth estimation in accordance with one embodiment of the disclosure.

FIG. 5 depicts a first example of depth estimation utilizing two heterogeneous cameras, comprising, homogenizing 510 a first camera image and a second camera image based on a first camera calibration dataset and a second camera calibration dataset respectively, wherein the first camera image and second camera image are distortion corrected and are zoom compensated. The method includes determining 512 an initial image pair rectification transformation matrix of the homogenized first camera image and the homogenized second camera image and determining 514 a delta image pair rectification transformation matrix based on the initial image pair rectification transformation matrix. The method also includes determining 516 a final image pair rectification transformation matrix based on the initial image pair rectification transformation matrix and the delta image pair rectification transformation matrix resulting in a final rectified image pair and disparity mapping 518 the final rectified image pair based on a depth net regression.

The first camera and the second camera may be weakly aligned and the distortion correction and/or the focal length compensation may be performed before image pair rectification. A neural network may be used to regress a drift of the rectifying transformation matrix of the image pair rectification and/or to map the disparity of the rectified image pair.

Figure 6:
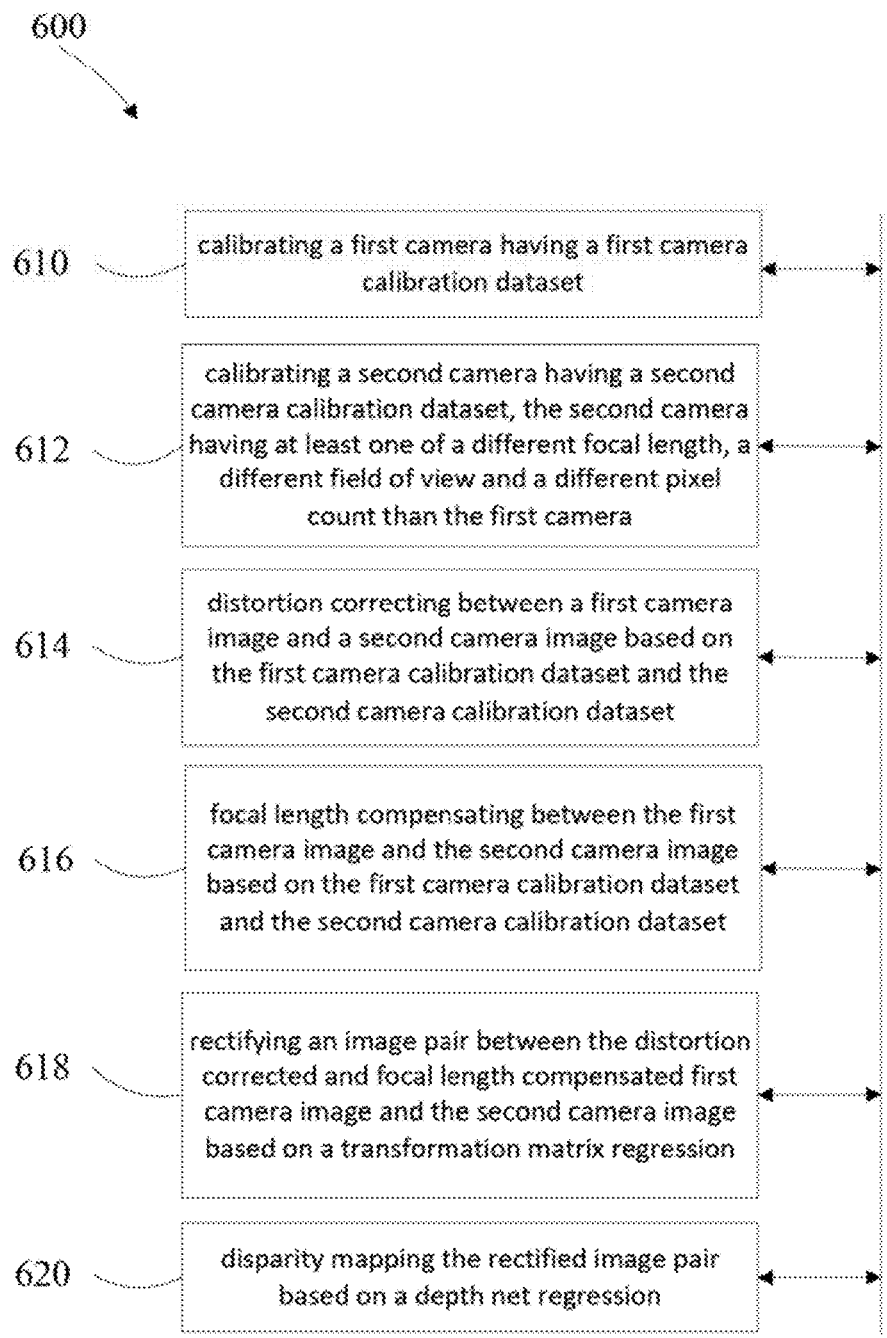
FIG. 6 is a second example method of depth estimation in accordance with one embodiment of the disclosure.

FIG. 6 depicts a second example of depth estimation utilizing two heterogeneous cameras comprising, calibrating 610 a first camera having a first camera calibration dataset and calibrating 612 a second camera having a second camera calibration dataset, the second camera having at least one of a different focal length, a different field of view and a different pixel count than the first camera. The method includes distortion correcting 614 between a first camera image and a second camera image based on the first camera calibration dataset and the second camera calibration dataset and focal length compensating 616 between the first camera image and the second camera image based on the first camera calibration dataset and the second camera calibration dataset. The method also includes rectifying 618 an image pair between the distortion corrected and focal length compensated first camera image and the second camera image based on a transformation matrix regression and disparity mapping 620 the rectified image pair based on a depth net regression.

The first camera and the second camera may be weakly aligned and the distortion correction and/or the focal length compensation may be performed before image pair rectification. A neural network may be used to regress a drift of the rectifying transformation matrix of the image pair rectification and/or to map the disparity of the rectified image pair.

Figure 7:
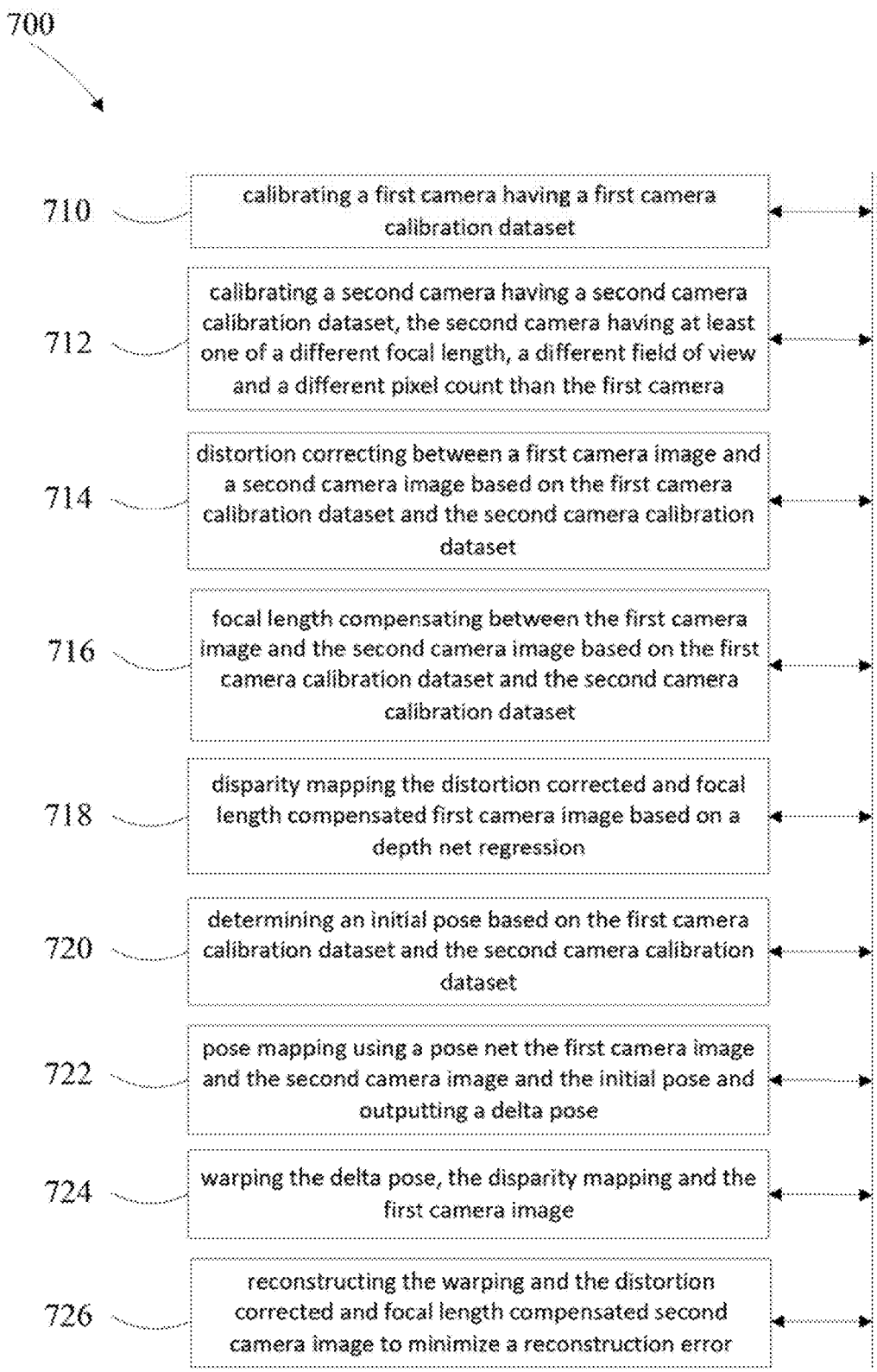
FIG. 7 is a third example method of depth estimation in accordance with one embodiment of the disclosure.

FIG. 7 depicts a third example of depth estimation utilizing two heterogeneous cameras comprising, calibrating 710 a first camera having a first camera calibration dataset and calibrating 712 a second camera having a second camera calibration dataset, the second camera having at least one of a different focal length, a different field of view and a different pixel count than the first camera. The method includes distortion correcting 714 between a first camera image and a second camera image based on the first camera calibration dataset and the second camera calibration dataset and focal length compensating 716 between the first camera image and the second camera image based on the first camera calibration dataset and the second camera calibration dataset. The method also includes disparity mapping 718 the distortion corrected and focal length compensated first camera image based on a depth net regression and determining 720 an initial pose based on the first camera calibration dataset and the second camera calibration dataset. The method further includes pose mapping 722 using a pose net the first camera image and the second camera image and the initial pose and outputting a delta pose. The method also includes warping 724 the delta pose, the disparity mapping and the first camera image and reconstructing 726 the warping and the distortion corrected and focal length compensated second camera image to minimize a reconstruction error.

Pose mapping may be performed online and tracked. The first camera and the second camera may be weakly aligned and the distortion correction and/or the focal length compensation may be performed before image pair rectification. A neural network may be used to regress a drift of a pose map transformation matrix and/or map the disparity of the first camera image.

Those of skill in the art would appreciate that the various illustrative blocks, modules, elements, components, methods, and algorithms described herein may be implemented as electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to" and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment." "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of depth estimation utilizing two heterogeneous cameras, comprising:
    calibrating a first camera having a first camera calibration dataset;
    calibrating a second camera having a second camera calibration dataset, the second camera having at least one of a different focal length, a different field of view and a different pixel count than the first camera;
    distortion correcting between a first camera image and a second camera image based on the first camera calibration dataset and the second camera calibration dataset;
    focal length compensating between the first camera image and the second camera image based on the first camera calibration dataset and the second camera calibration dataset;
    disparity mapping the distortion corrected and focal length compensated first camera image based on a depth net regression;
    determining an initial pose based on the first camera calibration dataset and the second camera calibration dataset;
    pose mapping using a pose net the first camera image and the second camera image and the initial pose and outputting a delta pose;
    warping the delta pose, the disparity mapping and the first camera image; and
    reconstructing the warping and the distortion corrected and focal length compensated second camera image to minimize a reconstruction error.

2. The method of depth estimation of claim 1, wherein the pose mapping is performed online.

3. The method of depth estimation of claim 1, wherein the pose mapping is tracked.

4. The method of depth estimation of claim 1, wherein the first camera and the second camera are weakly aligned.

5. The method of depth estimation of claim 1, wherein distortion correction is performed before image pair rectification.

6. The method of depth estimation of claim 1, wherein focal length compensation is performed before image pair rectification.

7. The method of depth estimation of claim 1, wherein a neural network is used to regress a drift of a pose map transformation matrix.

8. The method of depth estimation of claim 1, wherein a neural network is utilized to disparity map the first camera image.

* * * * *